US005239688A

United States Patent [19]

Dorrie et al.

[11] Patent Number: 5,239,688

[45] Date of Patent: Aug. 24, 1993

[54] MULTI-RANGE, MULTI-USE ANTENNA ADAPTER

[75] Inventors: Horst Dorrie; Uwe Militz, both of Berlin, Fed. Rep. of Germany

[73] Assignee: Robert Bosch GmbH, Stuttgart, Fed. Rep. of Germany

[21] Appl. No.: 647,912

[22] Filed: Jan. 30, 1991

[30] Foreign Application Priority Data

Mar. 17, 1990 [DE] Fed. Rep. of Germany ....... 4008632

[51] Int. Cl.[5] ............ H04B 1/44

[52] U.S. Cl. ............ 455/83; 455/74

[58] Field of Search ............ 455/74, 78, 83, 82, 455/79, 127; 343/715

[56] References Cited

U.S. PATENT DOCUMENTS

| | | | |
|---|---|---|---|
| 4,037,177 | 7/1977 | Tyrey | 455/74 |
| 4,106,025 | 8/1978 | Katz | 343/715 |
| 4,525,863 | 6/1985 | Stites | 455/83 |
| 4,850,034 | 7/1989 | Campbell | 455/74 |

OTHER PUBLICATIONS

*Elektor* article "Citizen Band in a Car", Apr. 1980 issue 4, pp. 59–61 (CB im Auto).

*Primary Examiner*—Reinhard J. Eisenzopf
*Assistant Examiner*—Edward Urban
*Attorney, Agent, or Firm*—Frishauf, Holtz, Goodman & Woodward

[57] ABSTRACT

To permit use of a hand-held transceiver, such as a radio telephone, as a vehicular car telephone, and operation thereof via a car radio receiving antenna (10), an active multi-range antenna switch is connected between the antenna (10), the car radio (27) and the transceiver (29). The antenna is connected to the car radio (27) through a first channel (13) which includes a low-pass filter (15) and an amplifier; the antenna (10) is further connected to the radio telephone via a second channel (14) which includes a high-pass filter (17), an inter-channel modulation suppression filter (18), an amplifier (19) connected to amplify signals from the radio telephone, and a power sensing relay (20) which, when the transceiver (29) is in receiving mode, bridges or shunts the amplifier (19), but opens the switch when the transceiver is in a transmitting mode, to provide amplification of transmission signals from the transceiver or radio telephone. The active switch can be connected to the car battery (32) which can also be connected through a separable connector (31, 30) to the radio telephone so that, when used in the vehicle, it will not draw on its own internal power supply (35), but be powered from the car radio. The low-pass filer (15) has a cut-off frequency of, approximately, 108 MHz and blocks transmission of the radio telephone signals in the car radio, the high-pass filter (17) having a low frequency cut-off for example of also 108 MHz, transmitting, however, readily within the 400 MHz band for portable telephones.

12 Claims, 1 Drawing Sheet

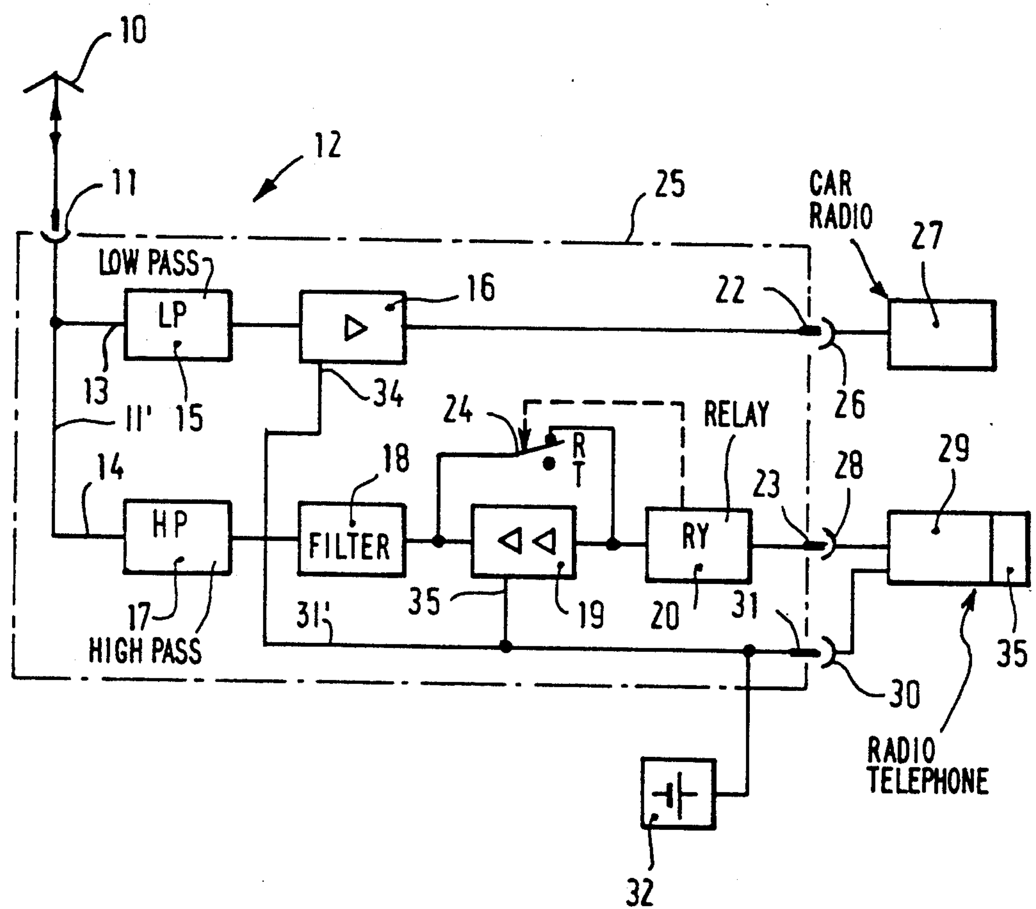
10
12
11
25
CAR RADIO
27
LOW PASS
LP
16
22
13
15
34
26
11'
24
RELAY
R
T
14
18
28
29
23
HP
FILTER
RY
17
HIGH PASS
31'
35
19
20
31
30
35
RADIO TELEPHONE
32

MULTI-RANGE, MULTI-USE ANTENNA ADAPTER

FIELD OF THE INVENTION

The present invention relates to an antenna adapter for selectively connecting an antenna, typically a vehicular or car antenna, to either a car radio or to a transceiver, such as a portable or car telephone.

BACKGROUND

Various antenna switches and adapters are known, and one, particularly, describes an antenna switch which permits a car antenna to, selectively, operate a car radio receiver or a 27 MHz citizen band radio. The antenna switch there shown has the disadvantage that it is entirely passive and thus is not capable of handling transmission power of a high-frequency transceiver, such as a portable telephone. Such portable telephones have very low transmission power, and a passive network, as known, has an excessive insertion loss so that the transmission power available for radiation from the known switch is not suitable for use with portable or radio telephones.

THE INVENTION

It is an object to provide an entirely automatically operating antenna adapter for selectively connecting an antenna as a receiving antenna to a car radio or as a transceiving antenna for a radio telephone transceiver although the radio telephone transceiver may have a very small output, and which adapter is simple and easy to install, particularly in an automotive vehicle.

Briefly, the car radio receiver is coupled to the antenna through a filter selective to the frequency range of the car radio, typically a low-pass filter having an upper cut-off at the upper FM range, i.e. about 108 MHz, and an amplifier to amplify those frequencies passed by the filter. A second filter having a low cut-off of about 108 MHz is provided, typically a high-pass filter, coupled to the antenna, and eventually coupled to the low power transceiver, that is, typically a portable radio telephone. Between the filter and the transceiver, an amplifier is inserted which is bypassed by a relay switch. The amplifier amplifies radio signals from the transceiver when in the transmitting mode. When in the receiving mode, the relay switches over and short-circuits the amplifier. The entire system can be included within a small shielded box, and powered from the vehicular battery, for example, or from an internal power source. The relay may be sensitive to the output from the transceiver, that is, for example switching over between reception and transmission upon sensing that the transceiver is changed to the transmission mode.

DRAWING

The single FIGURE is a schematic block circuit diagram of the antenna switch.

DETAILED DESCRIPTION

A vehicular antenna 10, for example a car radio, designed to be responsive to the customary radio station frequency bands, is so arranged that it is also capable to transmit and receive radio signals within frequency ranges above those of the radio station frequency bands. The radio station frequency bands, typically, extend from the amplitude modulation (AM) bands to frequency modulation (FM) bands, up to about 108 MHz; the radio telephone frequency band, however, is in the order of about 400 MHz.

This universal antenna 10 has a coupling connector 11 with which it is releasably coupled to the active automatic antenna adapter unit 12. Coupler 11 is connected to an input bus 11' which is connected to two parallel channels 13, 14. Channel 13 includes the series circuit of a low-pass filter 15 and a first high-frequency amplifier 16. It is then coupled through a severable coupler 22, 26 to a car radio 27.

The second channel 14 is formed by the series circuit of a high-pass filter 17, a harmonic filter 18, a second high-frequency amplifier 19, and a switching circuit 20, 24, and terminates in a second severable connector 23, 28. The connector portion 28 of the severable connector is connected to the radio frequency input/output of a radio telephone 29.

A switching circuit 20, 24 is provided formed by a high-frequency responsive relay 20 and relay switching terminals 24, which are connected to shunt or bridge over the second high-frequency amplifier 19.

The adapter 12, enclosing all the circuit elements 11' through 23, is, preferably, formed by a single shielded housing, schematically shown by the chain-dotted line 25 in the drawing.

The releasable connector 26 is, preferably, the antenna input of the car radio 27; the releasable connector 28, preferably, is the antenna terminal of a transceiver 29. This transceiver 29 has low transmission power, and, for example, is or forms part of a portable or hand-held radio telephone.

The portable transceiver 29 has an additional connector 30 which, for example, can be connected via a connection plug 31 to a fixed bus 31' which can be connected to the vehicle battery 32, to which also the active switch 12 is connected. The bus 31' also provides current supply at terminals 34, 35 to the amplifiers 16, 19, respectively.

OPERATION

Radio signals, for example entertainment radio signals, picked up by the antenna 10, are conducted through the low-pass filter 15 to the input of the first high-frequency amplifier 16, are pre-amplified therein, and coupled via the couplers 22, 26 to the antenna input of the car radio 27. The upper limit of the filter 15 is, for example, approximately 108 MHz, passing all frequencies therebelow. Signals intended for use by the radio telephone are picked up or radiated form the antenna 10 and conducted to the high-pass filter 17 via channel 14. The high-pass filter has a limiting frequency at the lower end which, also, for example is about 108 MHz. It prevents transmission of ordinary radio signals intended for the car radio 27 into the second channel 14.

Telephone radio signals which, for example, are in the frequency range of about 400 MHz and received by the antenna 10, are blocked by the low-pass filter 15 from the first channel 13. These signals, thus, can pass through the high-pass filter 17, the filter 18, which is provided to prevent inter-channel modulation interferences, and then, if the transceiver 29 is in the receiving mode, through the closed terminal "R" and through the relay 20 to the couplers 23, 28 and then to the antenna terminal of the transceiver 29.

Upon switching-over of the transceiver 29 to the transmitting mode, relay sensing circuit 20, which is responsive to high-frequency signals of higher energy than those received by the antenna 10, cause the relay terminals 24 to switch over to the "transmit" mode, thus opening the switch 24. The second high-frequency amplifier 19 will amplify the signals transmitted by the transceiver 29 to a value which corresponds to the customary transmission power of a vehicular transceiver, such as a car radio. The filter 18 conducts the amplified high-frequency signals through the high-pass filter 17 to the antenna 10. The low-pass filter 15 blocks these transmitted signals from passing through the first channel 13.

The transceiver 29 is supplied with power from a power source 35 which can be external of the vehicle, or part of the vehicle power supply; in any event, the power source 35 is suitable to supply the transceiver 29 when it is used outside of the vehicle. In a hand-held radio telephone apparatus, the current supply preferably is derived also from the vehicle battery 32, via severable connectors 30, 31, in which the case the internal power supply 35 is disconnected. The radio telephone can be placed in a suitable mechanical holder or socket, in which the adapter 12, forming an active switch, is also located. When the hand-held radio telephone 29 is pushed into the holder, connectors 30, 31 provide for electrical connection to the vehicle battery 32; and the connectors 23, 28 the electrical connection from the antenna terminal of the portable radio telephone 29 to the adapter 12; connectors 22, 26, the electrical connection to the antenna terminal of the radio receiver 27 to the adapter 12; and coupler 11 the electrical connection of the adapter 12 to the antenna 10. The adapter 12 thus is a unitary plug-in element within housing 25, connectable to a battery 32.

Various changes and modifications may be made; the relay 20-24 is shown only schematically and may, of course, be an electronic relay. With minor modifications of the relay circuit, the second high-frequency amplifier 19 can be connected to normally supply preamplification to the radio telephone 29, to be switched over in the amplification direction shown in the FIGURE upon the sensing portion 20 of the relay sensing a higher power level from the radio telephone 29 than appropriate for reception of signals by the transceiver 29.

Various other changes and modifications may be made within the scope of the inventive concept.

We claim:

1. Active, multi-range, multi-use antenna adapter for selectively connecting an antenna (10) to a car radio receiver (27) or to a transceiver (29) which is selectively operable in a receiving mode or a transmitting mode, wherein, when the transceiver is in transmitting mode, the transmitting power delivered by the transceiver is too small for effective transmission, and wherein the transceiver operates in a frequency band which is high with respect to the frequency band of the car radio receiver (27), said adapter having a first and common terminal (11) for connection to said antenna;

a second terminal (22) for connection to an antenna terminal (26) of the car radio receiver (27); and a third terminal (23) for connection to an antenna terminal (28) of the transceiver (29);

a low-pass filter (15) selective to the frequency band of operation of the car radio receiver (27); and a high-pass filter (17) selective to the frequency band of operation of the transceiver (29), said adapter further comprising a first radio frequency amplifier (16) connected between said first filter (15) and the car radio receiver (27); and a series circuit including a second radio frequency amplifier (19) connected to amplify signals from the antenna terminal (28) of the transceiver (29) when the transceiver is in the transmitting mode, and a bypass switch (20, 24) selectively connecting (a) when the transceiver is in transmitting mode, the second radio frequency amplifier (19) in circuit between said transceiver (29) and the second filer (17) for amplifying signals from the transceiver to be transmitted to the first or common terminal (11) and hence to the antenna (10), or (b) when the transceiver is in receiving mode, a circuit path for signals from the first or common terminal (11) to the antenna terminal (28) of the transceiver (29) between said high-pass filter (17) and the transceiver (29).

2. The antenna adapter of claim 1, wherein said bypass switch (20, 24) comprises a high-frequency current relay, having switching terminals (24) which bridge or shunt across the second ratio frequency amplifier (19) when said transceiver (29) is in receiving mode.

3. The antenna adapter of claim 2, wherein said relay includes a sensing circuit (20) responsive to power level passing therethrough when the transceiver is in the transmitting mode, said sensing circuit controlling selectively bypassing of said second radio frequency amplifier (19) unless operation of the transceiver in the transmitting mode is sensed.

4. The antenna adapter of claim 2, further including an inter-channel modulation suppression filter (18) connected between said high-pass filter (17) and the second high-frequency amplifier (19).

5. The antenna adapter of claim 1, wherein said transceiver (29) composes a manually operable hand-held radio telephone; and an antenna input/output terminal (28) is provided on said radio telephone, releasably connectable with said third terminal (23) of the antenna adapter.

6. The antenna adapter of claim 5, further including a fourth terminal (31) on said adapter, said fourth terminal being coupled to a vehicle battery (32);

and a severable connection (30) to said fourth terminal (31) coupled to said transceiver (29) for supplying power to the transceiver via said antenna adapter.

7. The antenna switch of claim 1, further including an inter-channel modulation suppression filter (18) connected between said high-pass filter (17) and the second high-frequency amplifier (19).

8. The antenna adapter of claim 7, wherein said further filter (18) is a harmonic filter.

9. The antenna adapter of claim 8, wherein said relay includes a sensing circuit (20) responsive to power level passing therethrough when the transceiver is in the transmitting mode, said sensing circuit controlling selectively bypassing of said second radio frequency amplifier (19) unless operation of the transceiver in the transmitting mode is sensed.

10. The antenna adapter of claim 7, wherein said relay includes a sensing circuit (20) responsive to power level passing therethrough when the transceiver is in the transmitting mode, said sensing circuit controlling selectively bypassing of said second radio frequency amplifier (19) unless operation of the transceiver in the transmitting mode is sensed.

11. The adapter of claim 1, comprising a housing unit (25), said housing unit having said first common terminal (11);

said second terminal (22) for connection to a matching terminal (26) of the car radio (27);

the third terminal (23) for connection to a matching terminal (28) of the transceiver (29); and a fourth terminal (31) for connection to a matching terminal (30) of the transceiver for supplying power to the transceiver via said adapter unit (25), said fourth terminal (31) being connectable to a source (32) of electrical energy, whereby said unit will for a plug-in unit for direct connection to the antenna (11), said car radio (27) and said transceiver (29).

12. The adapter of claim 1, wherein said bypass switch establishes a shunt or bridge across the second radio frequency amplifier.

* * * * *